Oct. 29, 1940.  A. F. HENNINGER, JR., ET AL  2,219,923
BATTERY OPERATED GASEOUS CONDUCTION LAMP FLASHER
Filed May 31, 1938   2 Sheets-Sheet 1
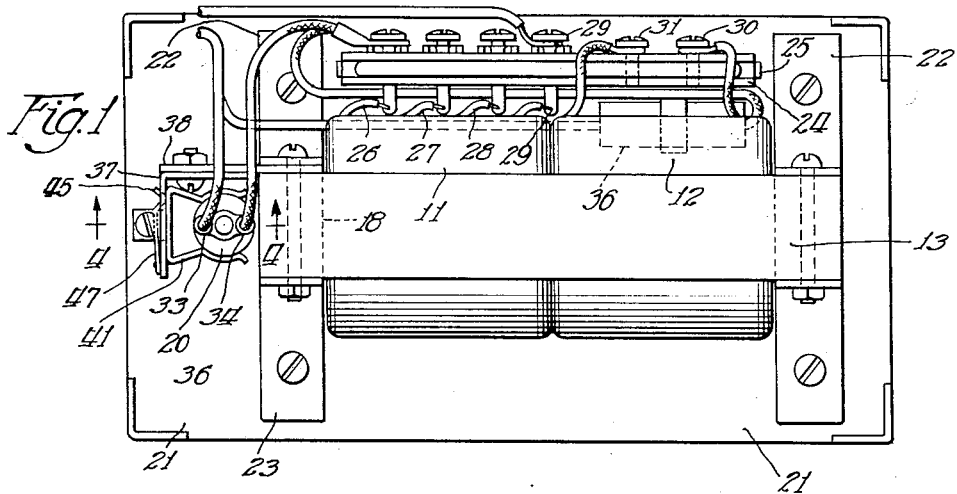
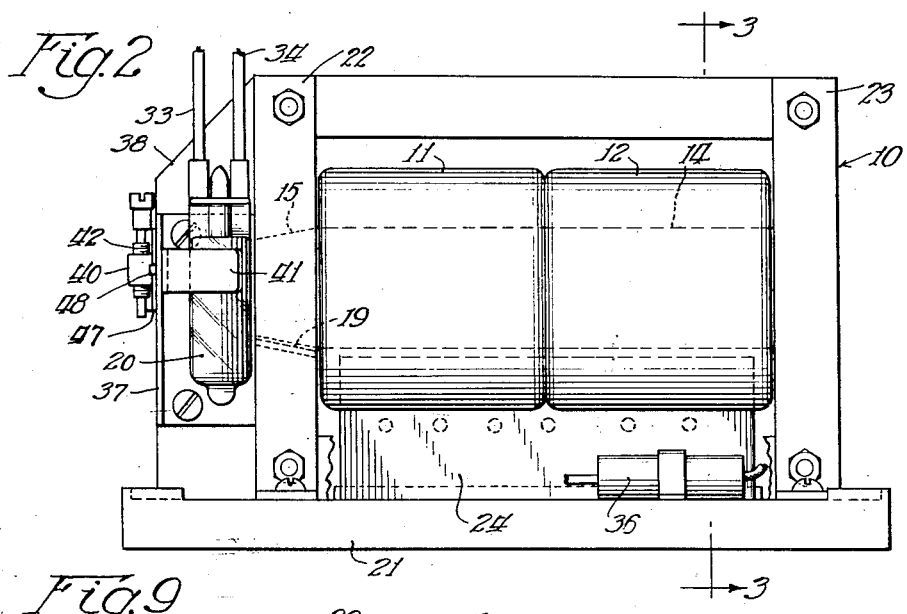
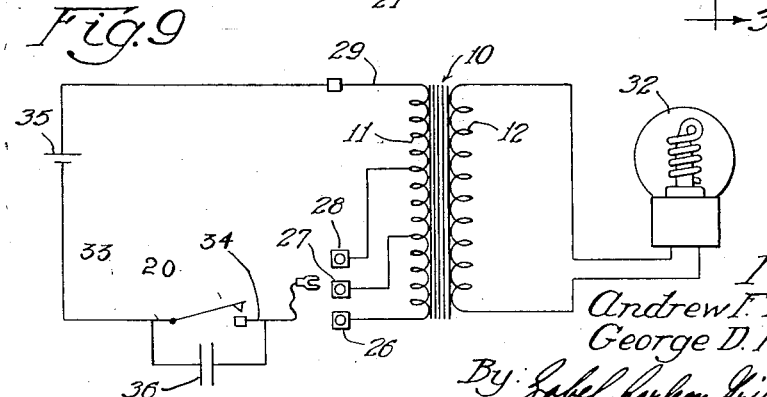
Inventors.
Andrew F. Henninger, Jr.
George D. Henninger

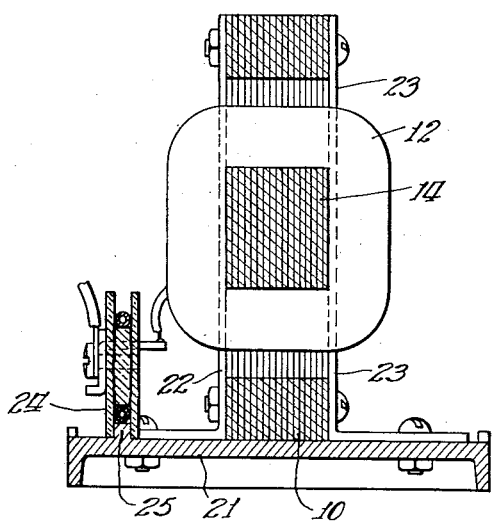
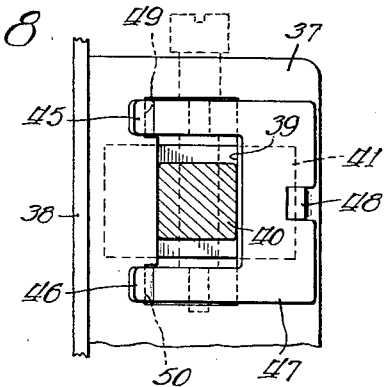
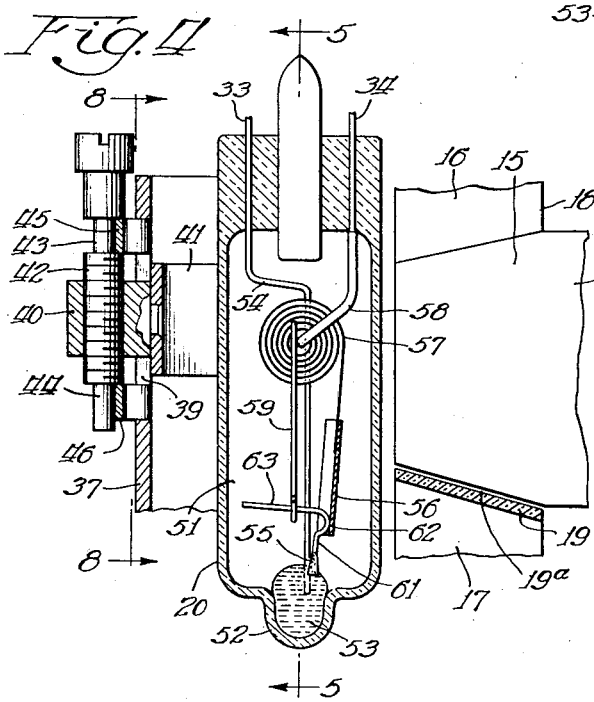

Patented Oct. 29, 1940

2,219,923

UNITED STATES PATENT OFFICE 2,219,923

BATTERY OPERATED GASEOUS CONDUCTION LAMP FLASHER

Andrew F. Henninger, Jr., and George D. Henninger, Chicago, Ill.

Application May 31, 1938, Serial No. 210,822

2 Claims. (Cl. 175—365)

The present invention relates to means for intermittently energizing the gaseous conduction lamps from a source of direct current supply such as the ordinary dry battery or storage battery.

The present invention is particularly applicable to the energizing of gaseous conduction lamps from a dry battery and is highly efficient in obtaining a high degree of illumination with a small current consumption.

It is the fundamental purpose of the present invention to provide a system of energizing a gaseous conduction or similar lamp from a source of direct current such as a dry battery, wherein a transformer is used and the primary circuit of the transformer is energized only for a brief period in comparison with its period of de-energization, and the energizing is done in such a fashion as to be readily controllable as to time of de-energization and speed of breaking of the circuit.

The invention contemplates the provision in a system of this character of a switch utilizing a mercury globule and an armature controlled metal contact electrode that is amalgamated with the mercury. The invention further contemplates a system of this character wherein the armature controlling the contact is directly influenced by the core of the transformer which is energized by means of the switch.

The present invention includes as a part thereof a combination of the energizing transformer with a control switch and a battery wherein the switch is shunted by a condenser located in the primary circuit of the transformer.

It is also a purpose of the invention to provide in a system of this character a novel means of controlling the rate of flashing, wherein the number of turns utilized in the primary of the transformer affects both the rate of flashing and the degree of illumination of the gaseous conduction tube. In this connection, the invention also contemplates a further adjustment whereby the rate of flashing may be more closely controlled.

The features and advantages of the present invention will appear more fully as the description proceeds, reference being had to the accompanying drawings wherein a preferred form of the invention is shown. It is to be understood, however, that the drawings and description are illustrative only and are not to be taken as limiting the invention except insofar as it is limited by the claims.

In the drawings,

Fig. 1 is a plan view of a flashing unit embodying the invention;

Fig. 2 is a view in side elevation of the flashing unit;

Fig. 3 is a sectional view taken on the line 3—3 of Fig. 2;

Fig. 4 is an enlarged fragmentary sectional view taken on the line 4—4 of Fig. 1;

Fig. 5 is a sectional view taken on the line 5—5 of Fig. 4;

Fig. 6 is a fragmentary sectional view similar to the lower part of Fig. 4, illustrating one position of the switch parts during the operation thereof;

Fig. 7 is a view similar to Fig. 6, showing the switch operation just after the circuit is broken;

Fig. 8 is a sectional view taken on the line 8—8 of Fig. 4, and;

Fig. 9 is a diagrammatic view of the circuit employed in the present invention.

Referring now to the drawings, the present invention is shown as embodied in a flashing unit including a transformer 10 having a primary coil 11 and a secondary coil 12 and a core 13. In the present form of the invention illustrated in the drawings, the coils 11 and 12 are arranged end to end upon a central leg 14 of the core 13, although it is obvious that they may be wound otherwise in accordance with known practice without departing from the scope of the present invention. The core structure 13 is made up of a plurality of laminations, and the central leg 14 has an end portion 15 which extends between adjacent parts 16 and 17 of the end piece 18. For a purpose which will presently appear, the end portion 15 is separated from the part 17 by a strip of insulation 19 which may be in the form of a thin fiber sheet. This is done to provide a gap in the transformer core opposite a switch 20 which forms a part of the flashing unit.

The transformer is mounted on a base 21 by means of L-shaped brackets 22 and 23. The base 21 also carries a wiring panel 24 which rests upon a rib 25 of the base 21. The panel 24 has terminals for three taps 26, 27 and 28 from the primary of the transformer and in addition has a terminal 29 for the connection of the transformer directly to one side of the battery and terminals 30 and 31 for connecting the secondary coil 12 to a gaseous conduction lamp 32. The lamp is shown only in Fig. 9 in the diagrammatic circuit view. This lamp, however, may be of any suitable construction. One form of lamp with which the flashing system is used is that shown in our application Serial No. 181,361.

The three taps 26, 27 and 28 are so arranged as to include more or less of the primary coil 11 in circuit, as will be explained more fully hereinafter.

The switch 20 has leads 33 and 34, one of which is adapted to be connected to a battery such as is shown at 35 in Fig. 9. The present device is particularly applicable to use with ordinary dry batteries, although, of course, it is not limited thereto in any sense. The other lead of the switch is adapted to go directly to one of the terminals 26, 27 or 28 of the primary. A condenser 36 which is supported upon the base 21 behind the wiring panel 24 is connected in shunt across the switch leads 33 and 34.

The switch 20 is mounted at one end of the transformer 10 in close proximity to the slot 19a in the coil of the transformer. A bracket 37 carries the switch, and this bracket is in turn carried by a plate 38 that is mounted on the transformer coil 13 by the same screws that secure this transformer to the L-shaped bracket 22. The bracket 37 has a vertical slot 39 therein which receives a block 40 that carries a spring clip 41. The block 40 is screw threaded to receive a threaded adjusting screw 42. The screw 42 has reduced cylindrical portions 43 and 44 thereon, which portions are adapted to engage spring fingers 45 and 46 of a clip 47. (See Figs. 4 and 8.) The clip 47 is secured to the bracket 37 by means of a lug 48 struck up from the bracket 37 and by the pressure of the spring fingers 45 and 46 against the screw 42. The fingers 45 and 46 at their extremities fit into notches 49 and 50 which are extensions of the aperture 39. By turning the screw 42, the block 40 can be raised or lowered a small amount. The spring clip 41 carries the switch 20.

The switch 20 is shown in detail in Figs. 4 to 7 inclusive. It comprises a gas tube 51 having in the bottom thereof a well 52 for a globule of mercury. The mercury globule 53 is permanently connected by a metal wire 54 to one lead 33 of the switch 20. The other lead 34 of the switch 20 is connected to an electrode 55 which is adapted to make and break contact with the mercury globule 53. The electrode 55 is connected to the lead 34 through an armature plate 56, a coil spring 57 and a supporting rod 58. The rod 58 also supports a guide stem 59 for guiding the electrode 55 in its swinging movement. This guide stem 59 has an eye 60 at its lower end and the electrode 55 is carried by a stem 61 which is secured to the armature 56 at 62 and which has a laterally extending part 63 going through the eye 60. The glass tube 51 is of course cleaned and pumped free of all active gas or other materials that would cause any decomposition of the mercury globule 53. The electrode 55 is of platinum which is easily wet by the mercury to lower the contact resistance. This platinum electrode 55 is carried by the stem 61 which is of iron and which is oxidized adjacent to the platinum electrode so as to prevent conduction from the mercury to the iron other than through the platinum. It is necessary to carefully make the connection between the platinum electrode 55 and the mercury globule 53 so as to obtain the proper breaking action, as will be hereinafter described.

Referring now to Figs. 4-7 inclusive, the operation of the switch is substantially as follows: When the device is not connected up to a source of current, the spring 57 will normally hold the armature 56 and the electrode 55 in the position shown in Fig. 4, with the electrode 55 extending into the mercury globule 53 and making a good, low resistance contact due to the wetting of the surface of the platinum by the mercury.

When the switch is connected in circuit, as shown in Fig. 9, with a battery and a transformer there is immediately completed a circuit through the transformer from one side of the battery to the other. This energizes the primary coil of the transformer, creating a flux in the core of the transformer, and the flux lines across the gap 19a in the transformer core will exert an attractive force on the armature 56 in the switch tube 51. The armature is attracted and moves the electrode 55 from the position shown in Fig. 4 to the position shown in Fig. 6. Owing to the tendency of platinum to adhere to the mercury, the globule 53 is deformed as shown in Fig. 6 until the weight of the mercury itself causes it to break away from the electrode 55. When this break occurs, the armature continues to swing to the position shown in Fig. 7 owing to the momentum that is imparted thereto, and the mercury globule returns to its original position, as shown in Fig. 7. Upon the breaking of the primary circuit in this fashion, the sudden change in flux builds up a high potential in the secondary winding 12 of the transformer and causes a discharge of current through the tube 32.

The condenser 36 is used to eliminate the current surge in the switch contacts and consequent sparking. Sparking is particularly damaging in a device of this character because it tends to vaporize the mercury which deposits on the walls of the tube and the switch parts and eventually depletes the mercury globule so as to cause erratic performance and even failure of the device to operate. The condenser being always in circuit with the primary tends to tune the primary circuit so that its dampening effect upon the secondary potential is considerably reduced. We find that with the condenser across the switch, as shown in Fig. 9, a much heavier discharge is obtained from the secondary which, of course, causes a much brighter light from the tube 32. This effect is a great deal more noticeable in a transformer wherein the primary and secondary are arranged as shown in the drawings than in one wherein the primary and secondary windings are wound one over the other.

The several taps of the primary winding 11 are utilized to control the speed and brilliancy of illumination. For example, as shown in Fig. 9, if tap 26 is connected to the switch all of the turns of the primary are in circuit. This means that the flow of current from the battery 35 through the primary 11 is at a minimum and the breaking of the circuit will set up much less flux in the core of the transformer than if more current were flowing through fewer turns of the primary. As the number of turns in the primary are cut down more current is drawn from the battery, which results in a greater flux density in the core of the transformer. The flux density in the core of the transformer directly affects the speed at which the armature 56 will be drawn from the position shown in Fig. 4 to that shown in Fig. 6. The coil spring 57 normally opposes and overcomes the pull of the residual magnetism of the core upon the armature 56. However, when the circuit is closed so that current is passed through the primary winding 11, the build up in flux density of the core immediately affects the armature 56 so as to overcome the pull of the spring 57. The greater the flux density becomes, the stronger will the pull be upon the armature 56, and naturally it will reach the position shown in Fig. 6 quicker under the stronger pull. Moreover, if the pull is stronger the return swing of the armature 56 will also begin quicker so that the entire operation of making and breaking the circuit by means of the globule of mercury 53 and the electrode 55 will be speeded up as the flux density is increased in the core of the transformer.

The secondary voltage induced by interrupting the primary circuit will of course be higher as the primary turns are reduced. Therefore, as the action of the flasher speeds up, a greater brilliancy of illumination of the tube 32 is obtained.

The armature 56 is normally directly opposite the gap 19a. However, this may give too fast an operation of the unit for a particular tap of the primary winding 11. In order to give a further, more accurate adjustment of the speed of interruption of the circuit, the screw 42 may be utilized to raise or lower the entire switch 20 and thus vary the effect of the flux discharge across the gap 19a upon the armature 56. The screw 42, if turned, will of course raise or lower the clip 41 and with it the switch 20.

We have found that with the device hereinabove described we can obtain a very brilliant lighting of the tubes 32 with a low consumption of current. The circuit for the battery is closed for a very small portion of the flashing cycle since it takes much less time for the energized armature 56 to draw the electrode 55 away from the mercury globule than it takes for the spring 57 to return the electrode. The discharge of the secondary through the tube 32 occurs after the circuit is broken by the mercury globule 53 and the electrode 55. We obtain, therefore, a very high efficiency in operation.

Having thus described our invention, what we claim as new and desire to secure by Letters Patent is:

1. In combination, a transformer having a primary and a secondary winding, a core having a central leg upon which the windings are carried and a peripheral portion extending around the coils, said peripheral portion having an air gap therein, a switch mounted alongside said core, said switch having a mercury globule therein and a spring mounted contact movable into and out of the mercury globule to make and break contact, and an armature carried by the spring mounted contact, said armature being opposite the air gap in the transformer core, and an energizing circuit for said transformer including a battery and said switch contacts in series across the primary winding of the transformer.

2. In combination, a transformer having a primary and a secondary winding, a core having a central leg upon which the windings are carried and a peripheral portion extending around the coils, said peripheral portion having an air gap therein, a switch mounted alongside said core, said switch having a mercury globule therein and a spring mounted contact movable into and out of the mercury globule to make and break contact, and an armature carried by the spring mounted contact, said armature being opposite the air gap in the transformer core, and an energizing circuit for said transformer including a battery and said switch contacts in series across the primary winding of the transformer, said primary winding having a plurality of taps whereby the number of turns in circuit may be varied.

ANDREW F. HENNINGER, Jr.
GEORGE D. HENNINGER.